United States Patent
Chu et al.

(10) Patent No.: US 11,841,875 B2
(45) Date of Patent: Dec. 12, 2023

(54) DATABASE SHARING IN A VIRTUAL PRIVATE DEPLOYMENT

(71) Applicant: Snowflake Inc., Bozeman, MT (US)

(72) Inventors: Pui Kei Johnston Chu, Richmond Hill (CA); Benoit Dageville, San Mateo, CA (US); Shreyas Narendra Desai, Bellevue, WA (US); Khondokar Sami Iqram, Burlingame, CA (US); Subramanian Muralidhar, Mercer Island, WA (US); Chieh-Sheng Wang, San Mateo, CA (US); Di Wu, Newark, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/060,441

(22) Filed: Nov. 30, 2022

(65) Prior Publication Data
US 2023/0185823 A1    Jun. 15, 2023

Related U.S. Application Data

(60) Provisional application No. 63/287,885, filed on Dec. 9, 2021.

(51) Int. Cl.
*G06F 16/00* (2019.01)
*G06F 16/27* (2019.01)
*H04L 9/40* (2022.01)

(52) U.S. Cl.
CPC .......... *G06F 16/27* (2019.01); *H04L 63/0272* (2013.01)

(58) Field of Classification Search
CPC ............................. G06F 16/27; H04L 63/0272
See application file for complete search history.

(56) References Cited

U.S. PATENT DOCUMENTS

| | | | |
|---|---|---|---|
| 7,991,791 B1 * | 8/2011 | Chen .................. | G06F 11/1435 707/787 |
| 8,683,566 B1 * | 3/2014 | Gailloux ................ | G06F 21/34 726/4 |
| 10,862,873 B1 * | 12/2020 | Carru .................... | H04L 9/3073 |
| 2003/0172090 A1 * | 9/2003 | Asunmaa ............... | H04L 63/06 |
| 2005/0114367 A1 * | 5/2005 | Serebrennikov ...... | G06F 16/951 707/E17.115 |
| 2014/0047263 A1 * | 2/2014 | Coatney ............. | G06F 11/2092 711/119 |
| 2016/0301695 A1 * | 10/2016 | Trivelpiece .......... | H04W 12/04 |
| 2017/0126626 A1 * | 5/2017 | Datta .................. | H04L 63/0272 |

* cited by examiner

*Primary Examiner* — Alexander Khong
(74) *Attorney, Agent, or Firm* — Schwegman Lundberg & Woessner, P.A.

(57) ABSTRACT

A network device communication system can configure network devices, such as a first database in a multi-tenant deployment and a second database in a private deployment, to send and receive sequence messages, such as replication data, over a channel comprising a plurality of private network nodes. The first database can create a link specifying the data share and the second database. The second database selects the link and a secure area in the private deployment is created into which data is replicated and shared with further accounts in a computationally secure and efficient manner.

27 Claims, 9 Drawing Sheets

DATABASE SHARING IN A VIRTUAL PRIVATE DEPLOYMENT

CROSS-REFERENCE TO RELATED APPLICATION

This application claims the benefit of earlier filing date and right of priority to U.S. Provisional Patent Application Ser. No. 63/287,885, filed on Dec. 9, 2021, entitled "DATABASE SHARING IN A VIRTUAL PRIVATE DEPLOYMENT", the contents of which are hereby incorporated by reference in its entirety.

TECHNICAL FIELD

The present disclosure generally relates to special-purpose machines that manage database data and improvements to such variants, and to the technologies by which such special-purpose machines become improved compared to other special-purpose machines for transmitting database data between databases connected by a network.

BACKGROUND

Databases are used for data storage and access in computing applications. A goal of database storage is to provide enormous sums of information in an organized manner so that data can be accessed, managed, and updated. In a database, data can be organized into rows, columns, and tables. Different database storage systems can be used for storing distinct types of content, such as bibliographic, full text, numeric, and/or image content. Further, in computing, different database systems can be classified according to the organization approach of the database. There are many diverse types of databases, including relational databases, distributed databases, cloud databases, and others.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
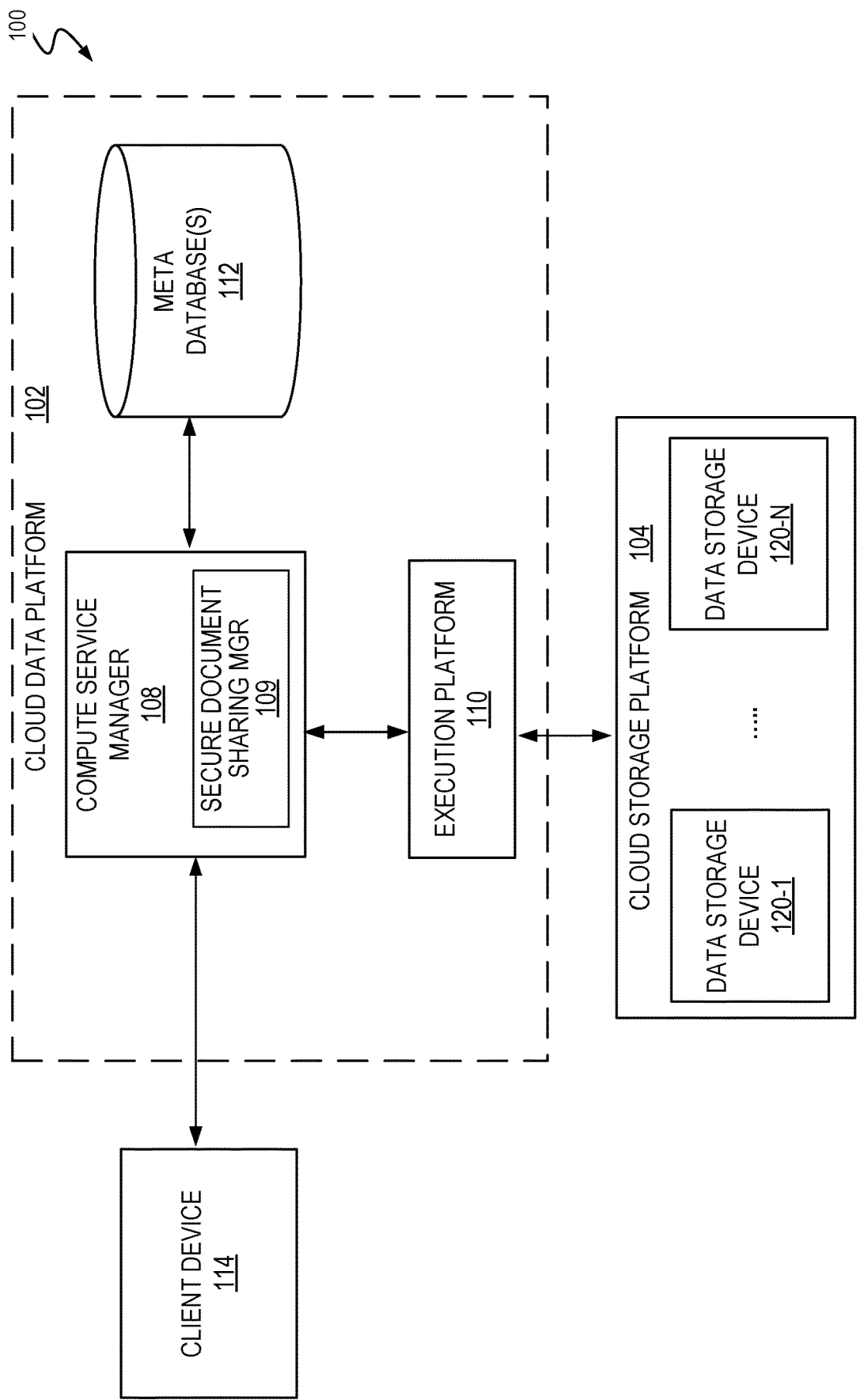
FIG. 1 illustrates an example computing environment in which a cloud data platform can implement streams on shared data storage devices, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter can be practiced without these specific details. In general, well-known instruction instances, protocols, structures, and techniques are not necessarily shown in detail.

In some instances, it can be beneficial to replicate database data in multiple locations or on multiple storage devices. Replicating data can safeguard against system failures that may render data inaccessible, cause the data to be lost or cause the data to be permanently unreadable. While replication between different databases increases the safety of the data, the data should be securely transmitted between the replication databases. Some database systems use encryption keys to authenticate one another and to encrypt data sent between the different database systems. For example, a database instance in one datacenter can use an encryption key to authenticate and receive communications from another database instance in another datacenter that is located at a different geographic location. While replication of database data and encryption keys increase the security of the data, implementing such approaches in different networked database systems, such as cloud databases, can be difficult to perform in a manner that is computationally efficient and secure.

As discussed, it can be difficult to securely manage database traffic sent and received between database systems. Prior relevant technologies simply enabled provider users to share data to a consumer user directly to the consumer's multi-tenant account. The consumer would then materialize the shared data in their multi-tenant account and replicate the shared data to a virtual private cloud (VPC) deployment account. However, this created a technical problem for VPC deployment users without multi-tenant accounts and required an intermediate step to load structured data from a third-party external source into a database employing extraction-transform-load (ETL) process.

An example cloud data platform includes a VPC deployment that uses cloud data storage devices and cloud compute resources dedicated to that deployment. Different deployments can be linked, and channels can be set up to send and receive data between the deployments. The VPC deployment is a virtualized environment that runs on the cloud data system hardware instances, which are physically isolated from other users of the system. The VPC deployment is an on-demand configurable pool of shared resources allocated within a public cloud environment and provides a level of isolation between different users (e.g., different organizations) using the VPC resources.

Example embodiments disclosed herein provide technical solutions to manage database traffic securely between isolated database systems by enabling VPC deployment users to identify and authorize a data provider to share data directly to the VPC deployment. Once the VPC deployment account has been authorized, the provider can create a listing and target the specific VPC deployment account. Such improvements as described throughout provide a secure shared area where data is replicated automatically when a consumer-user requests the data.

For example, a first VPC deployment, deployment_A, can be a deployment (e.g., a database management system (DBMS) running within an Amazon Web Services® (AWS) Virtual Private Cloud (VPC)) at a first region, such as San Francisco, and a second VPC deployment, deployment_B, can be another deployment (e.g., another DBMS in a different AWS VPC) at a second region, such as New York City. Deployment_A and deployment_B can create a link over which a stream of data, such as replication traffic, is sent between the two deployments. For example, replication traffic of a primary database in deployment_A can be replicated to a secondary database located in deployment_B.

While it may be possible to replicate the traffic from deployment_A to deployment_B, it can still be difficult to ensure that the data takes a certain path or stays within a certain region while in transit between the two deployments. For instance, a database administrator may require that none of its data in its databases ever be transferred over the open Internet. Further, to comply with data governance laws, the database administrator may seek to configure their databases such that all data in the database network stays within a certain region. For example, the database administrator may seek to ensure that all data transferred between deployment_A and deployment_B remain within a given country (e.g., USA) and additionally the data may never be transferred over the open Internet (e.g., encrypted in TLS traffic over the Internet) while in the given country.

Additionally, many VPCs are not configured for replication between the different VPCs and may charge egress export fees (e.g., egress fees) even though the traffic is being replicated to another deployment of the same VPC provider. Further difficulty arises when sending data between different types of database deployments securely. For example, if deployment_A is a VPC from a first provider (e.g., AWS VPC) and deployment_B is a VPC from second different provider (e.g., Google Private Cloud (GPC)), the different providers may have different and potentially incongruent security mechanisms. For instance, deployment_B may implement a hardware security module (HSM) that does not enable importing or exporting of encryption keys, thereby greatly increasing the difficulty and practicality of transferring data between the deployments. Additionally, even when the different deployments have congruent security mechanisms (e.g., each deployment has an HSM that enables import/export of keys), managing the keys as the number of replicated databases increases to enterprise levels (e.g., hundreds of thousands of database customers at the different deployments, where each replicates data to other database in other deployments) is exceedingly difficult to implement in a secure manner that scales with network growth.

To address these issues, a replication manager and channel manager can be implemented in a deployment to encrypt the traffic in an approach that is agnostic to various configurations of HSMs and VPCs, and further to transfer the traffic between deployments using nodes of a private network that are external to the deployments. For example, the private network can be a virtual private network (VPN) that implements VPN nodes (e.g., AT&T® NetBond® nodes, a VPN server/node at a first location and another VPN server/node at a second location) to transfer traffic within the virtual private network. When one or more databases in deployment_A send data to another database in deployment_B (e.g., replication traffic) the channel manager can implement a cloud connection (e.g., hosted connections provided by the given VPC provider such as AWS Direct Connect®, or a physical connection such as Ethernet port) to send data from deployment_A to a node of the virtual private network.

Each of the nodes of the virtual private network can be set up and positioned within a given region (e.g., in a country, or avoiding/excluding a specified country), thereby ensuring the data is not transferred outside the region and not exposed or otherwise transferred over the open Internet. The traffic continues over the VPN nodes to the destination database in deployment_B. In some example embodiments, the VPN node nearest deployment_B then imports the traffic into the destination database using a cloud connection provided by deployment_B (e.g., hosted connection of the cloud, such as AWS Direct Connect; a direct port connection such as Azure Express Route®; a physical Ethernet cord connecting the VPN node to hardware of deployment_B, etc.).

Additionally, and in accordance with some example embodiments, the traffic is encrypted using internal message keys to efficiently transfer the traffic between the databases at different deployments. In some example embodiments, a replication manager can generate the messages and keys at the database application level, without requiring changes to a given VPC, HSM, or VPN node transfer network. For example, in some example embodiments, the traffic is sent in a sequence of messages using a pre-configured key encryption structure. In some example embodiments, in each message, the data is encrypted by a symmetric key (e.g., data encryption key (DEK) unique to that message). The data encryption key for the given message can be further encrypted by a wrapping replication key (WRK), which can be another symmetric key generated by the sending deployment (e.g., periodically generated by an HSM in deployment_A). In some example embodiments, the WRK is then encrypted by a key from a keypair, such as the public key of the destination deployment. In some example embodiments, the encrypted WRK to access a DEK in a given message is also stored in the given message. In other example embodiments, the WRKs are staggered between messages such that a given message's DEK is encrypted using a previously sent WRK (e.g., a WRK sent in a previously received message). Further, in some example embodiments, the WRKs are rotated based on time expiration periods or randomly to increase security of the data. In this way, the replication manager and channel manager of the database systems (e.g., database applications running on VPNs) can efficiently and securely transmit data between different clouds at the applications level over specific paths even where the cloud systems are incongruent or cannot be customized.

FIG. 1 illustrates an example computing environment 100 that includes a database system in the example form of a cloud data platform 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the cloud data platform 102 in communication with a cloud storage platform 104 (e.g., AWS®, Microsoft Azure Blob Storage®, or Google Cloud Storage). The cloud data platform 102 is a network-based system used for reporting and analysis of integrated data from one or more disparate sources including one or more storage locations within the cloud storage platform 104. The cloud data platform 102 can be a network-based data platform or network-based data system. The cloud storage platform 104 comprises a plurality of computing machines and provides on-demand computer system resources such as data storage and computing power to the cloud data platform 102.

The cloud data platform 102 comprises a compute service manager 108, an execution platform 110, and one or more metadata databases 112. The cloud data platform 102 hosts and provides data reporting and analysis services to multiple client accounts.

The compute service manager 108 coordinates and manages operations of the cloud data platform 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the cloud data platform 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the cloud data platform 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

The compute service manager 108 is further coupled to the execution platform 110, which provides multiple computing resources that execute various data storage and data retrieval tasks. The execution platform 110 is coupled to cloud storage platform 104. The cloud storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N can be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

Since a shared data object or data set may include confidential or other types of sensitive data, securing the data set is a significant consideration for participating client devices (e.g., client devices associated with data providers or data consumers). Existing third-party secure sharing tools are time-consuming and cumbersome. A secure document sharing manager 109 may be operatively connected to the compute service manager 108 within the cloud data platform 102. The compute service manager 108 may include a secure document sharing manager 109. The secure document sharing manager 109 comprises suitable circuitry, logic, interfaces, and/or code and is configured to perform functionalities discussed herein in connection with secure document sharing, also referred to herein as secure data sharing or secure object sharing, within the computing environment 100. For example, the secure document sharing manager 109 is configured to detect queries for shared data and invoke security functions configured in the execution platform 110.

In some embodiments, the secure document sharing manager 109 may determine whether or not to invoke (or trigger) secure document sharing functions based on analysis of metadata associated with a data object or data file (e.g., data file responsive to a query) or multiple data files of a data producer stored in an external or internal stage. For example, certain types of data files (e.g., unstructured data files containing a keyword or other metadata) can be selected for processing using the disclosed secure document sharing techniques based on metadata analysis.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata database(s) 112, execution platform 110, and cloud storage platform 104 are shown in FIG. 1 as individual discrete components. However, each of the compute service manager 108, metadata database(s) 112, execution platform 110, and cloud storage platform 104 can be implemented as a distributed system (e.g., distributed across multiple systems/platforms at multiple geographic locations). Additionally, each of the compute service manager 108, metadata database(s) 112, execution platform 110, and cloud storage platform 104 can be scaled up or down (independently of one another) depending on changes to the requests received and the changing needs of the cloud data platform 102. Thus, in the described embodiments, the cloud data platform 102 is dynamic and supports regular changes to meet the current data processing needs.

During typical operation, the cloud data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a suitable candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the cloud storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
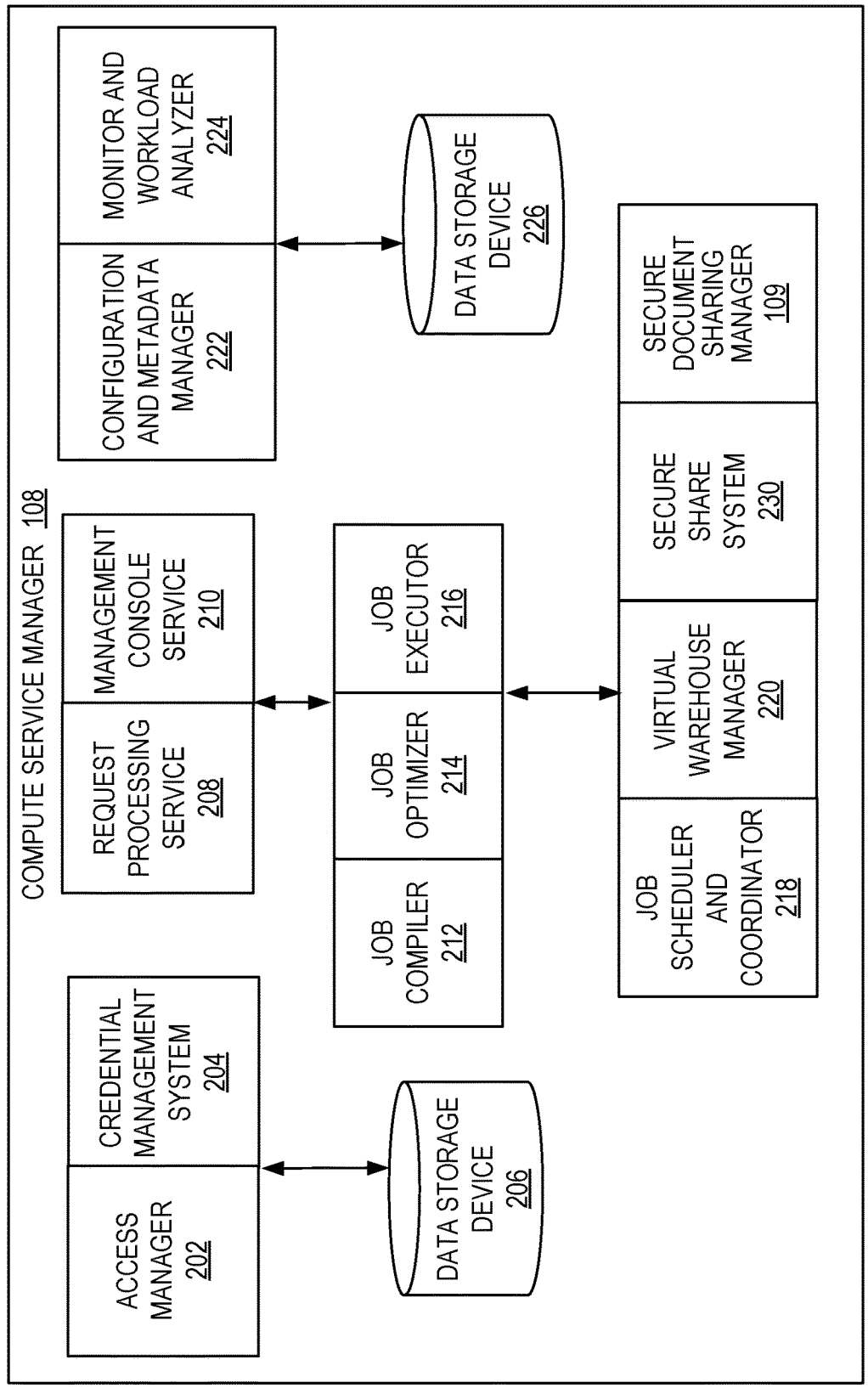
FIG. 2 is a block diagram illustrating components of a compute service manager, according to some example embodiments.

FIG. 2 is a block diagram 200 illustrating components of the compute service manager 108, in accordance with some embodiments of the present disclosure. As shown in FIG. 2, the compute service manager 108 includes an access manager 202 and a credential management system 204 coupled to access data storage device 206, which is an example of the metadata database(s) 112. Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data can be stored in a cache within the execution platform 110 or in a data storage device in cloud storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs can be prioritized and then processed in that prioritized order. In an embodiment, the job scheduler and coordinator 218 determines a priority for internal jobs that are scheduled by the compute service manager 108 with other "outside" jobs such as user queries that can be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

A secure share system 230 is configured to share data from a multi-tenant deployment to a virtual private deployment on the cloud data platform 102 in a secure and efficient manner, as discussed in further detail below. The secure document sharing manager 109 may be operatively connected to secure share system 230.

Example embodiments of the secure share system 230 provide for sharing a "shared data object," "database object," or "share object" between a provider account and a consumer account in a cloud data system, such as the cloud data platform 102. The secure share system enables sharing between a first deployment, such as a provider, and a second deployment, such as a consumer. It should be appreciated that the terms "provider" and "consumer" are illustrative only and may alternatively be referred to as a first account and a second account, as a sharer account and a target account, as a provider and a receiver, and so forth The secure document sharing manager 109, alone or in combination with the secure share system 230, is enabled to manage sharing of documents, such as a share object, between the one or more accounts in the one or more deployments. The share object or shared data in one implementation may include procedural logic that is defined by a user of a provider account (in one implementation, by a user of the sharer account). The share object may be supported in scalar and table-valued user-defined functions (UDFs) and may be defined by any suitable language. The procedural logic a the share object may be used by one or more other accounts without permitting the one or more other accounts to view the underlying code defining the procedural logic. The share object or shared data may further include database data such as data stored in a table of the database. The share object can include metadata about database data such as minimum/maximum values for a table or micro-partition of a database, underlying structural or architectural details of the database data, and so forth.

The secure document sharing manager 109 can further be enabled to manage the types of data in the share object. For example, the share object can include a listing of all other accounts that can receive cross-account access rights to elements of the share object. The listing may indicate, for example, that a second account may use procedural logic of the share object without seeing any underlying code defining the procedural logic. The listing may further indicate, for example, that a third account may use database data of one or more tables without seeing any structural information or metadata about the database data. The listing may indicate any combination of usage privileges for elements of the share object, including whether secondary accounts may see metadata or structural information for database data or procedural logic.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the cloud data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the cloud data platform 102. For example, data storage device 226 may represent buffers in execution platform 110, storage devices in cloud storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
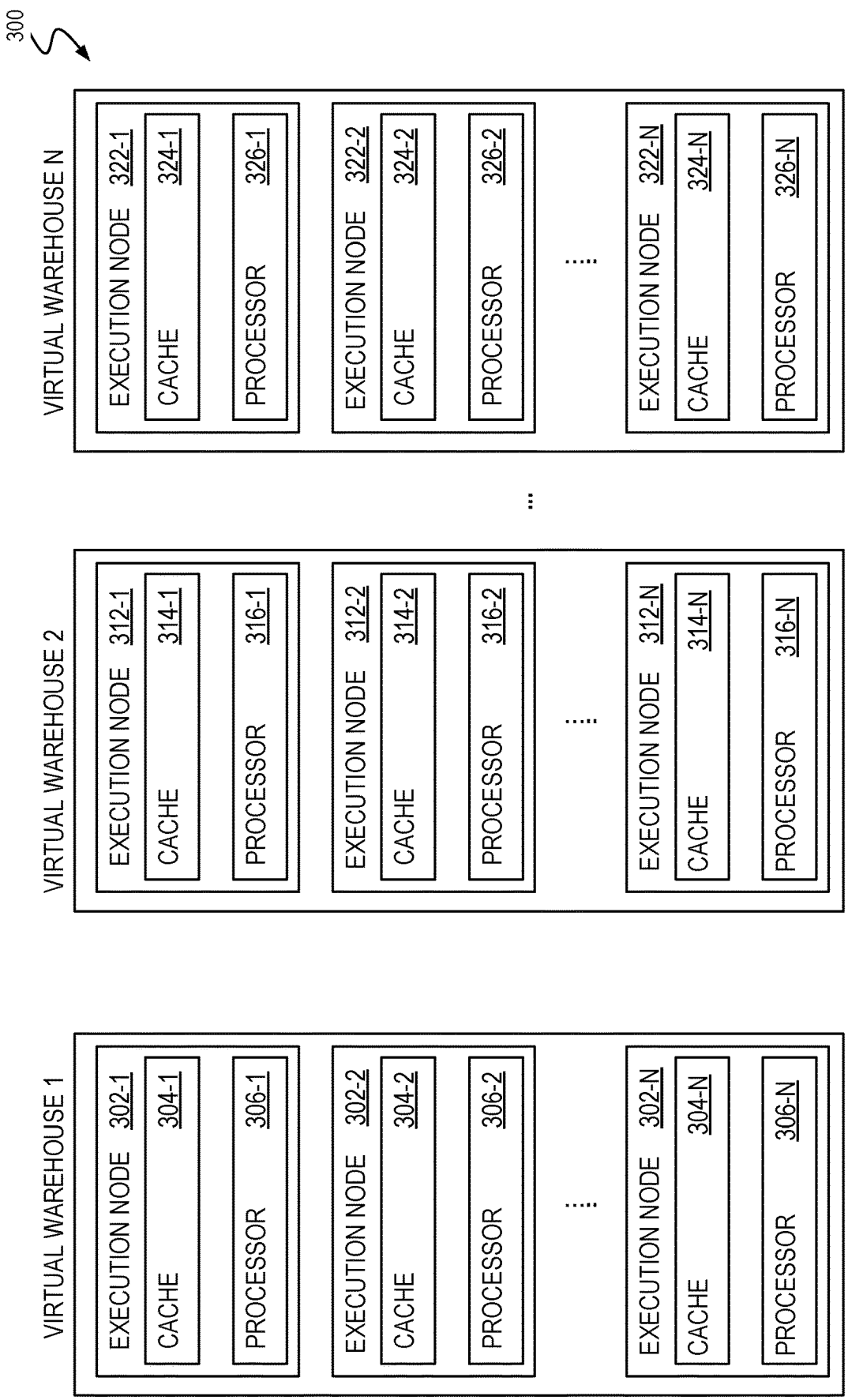
FIG. 3 is a block diagram illustrating components of an execution platform, according to some example embodiments.

FIG. 3 is a block diagram 300 illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node can be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse N includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor intensive. Similarly, an execution node may be assigned more cache resources if the tasks performed by the execution node require a larger cache capacity.

Although virtual warehouses 1, 2, and N are associated with the same execution platform 110, the virtual warehouses can be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse can be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses can be deleted when the resources associated with the virtual warehouse are no longer useful.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Figure 4:
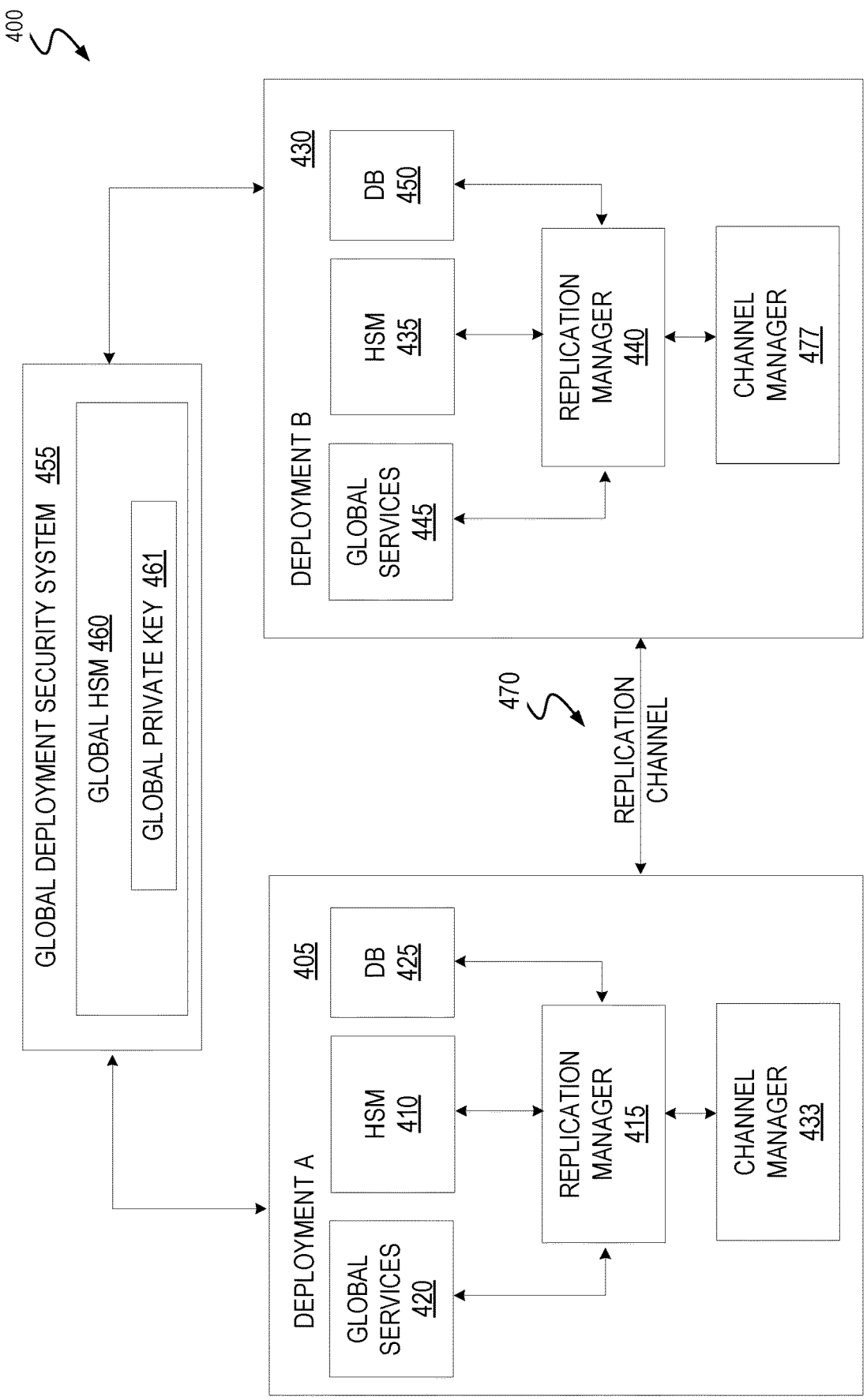
FIG. 4 is a block diagram illustrating a database architecture for transmission of database data over a channel, according to some example embodiments.

FIG. 4 shows an example database architecture 400 for transmission of database data over a channel (e.g., private channel), according to some example embodiments. As discussed above, an HSM is a hardware security module, which is a physical computing device that safeguards and manages digital keys for strong authentication. Example HSMs can be implemented as a plug-in card or server rack module that attaches directly to a computer or network service running within the deployment's cloud execution instances (e.g., within the VPN of the cloud platform, such as AWS). In some example embodiments, a given deployment's HSM is provided by the cloud provider as a network service, along with the provided execution units (e.g., Amazon S3, Google Cloud, Microsoft Azure each offer HSM services for their cloud compute units, e.g., virtual machines).

In some example embodiments, the encryption keys are generated and managed by the HSMs in each deployment. As discussed above, if two deployments are being connected (e.g., a mesh of deployments), this can make use of exporting encryption keys (e.g., symmetric key, private keys, public key, key pairs) out of one deployment's HSM and importing the key data into another deployment's HSM (e.g., a new deployment that is being added to the mesh). For example, to safeguard data, an existing deployment is replicated resulting in the creation of a new deployment, the data from the existing deployment is copied or otherwise replicated over to the new deployment, the key is exported by the existing deployment's HSM, and the key is imported by the new deployment's HSM. After creation and exporting/importing of the key, the new deployment can function as a secondary or replication deployment that stores data replicated from the existing deployment, which then functions as a "primary" or source deployment. While HSMs provide secure encryption functions, HSM processing does not scale well and can increase the processing overhead as more deployments are added to a given networked system. Thus, there is an existing demand for using non-HSM operations where possible, so long as the non-HSM processing can be performed securely.

Furthermore, not all HSMs provide key importing or exporting functions, which inhibits replication of deployments using such systems. One approach to handling HSM scaling issues involves creating a public key document that stores each deployment's public key, where new deployments add their public key to the public key document and encrypt outbound messages with the target deployment's public key (which is then decryptable by the target deployment via its private key). However, one issue with this approach is that it can be difficult to manage the public key document in a secure manner, as the number of deployments scale to enterprise levels.

Additionally, even if a given deployment knows the target deployment's public key, which does not ensure that the target deployment is who it says it is. That is, for example, the target deployment can be a compromised or otherwise malicious deployment that is seeking to intercept data by proffering the compromised or malicious deployment's public key to other legitimate deployments in the mesh. Additionally, it is impractical to perform key rotation using the public key document (where key rotation is when each public key is replaced with a new public key), at least in part because each deployment would rotate their keys at the same time, which is difficult to do in practice and can be prone to errors.

To solve these issues, a replication manager can implement asymmetric keys and one or more symmetric keys to transmit data between databases, such as a source deployment (e.g., a primary database application in a VPN) and a target deployment (e.g., one or more secondary or replicated databases in another VPN cloud). In some example embodiments, each deployment generates a replication asymmetric keypair (RAK) to send and receive encrypted data, and an authentication asymmetric keypair (AAK) that is used to authenticate the given deployment. In some example embodiments, each deployment further generates a symmetric key to encrypt/decrypt each data file sent (e.g., data encryption key (DEK)), and a symmetric wrapping replication key (WRK) which wraps the DEKs, where the WRKs can be staggered across messages and constantly changed to further secure the sent data. The replication manager can use these keys in an authentication process and messaging protocol to securely send and receive data between the deployments without reliance on importing/exporting of keys from the HSMs.

Generally, an example asymmetric keypair includes PKI (Public Key Infrastructure) keys comprising a private key and a corresponding public key. The PKI keys are generated by the HSMs using cryptographic algorithms based on mathematical problems to produce one-way functions. The keypair can be used to securely send data and also to authenticate a given device. To securely send/receive data using an asymmetric keypair, the public key can be disseminated widely, and the private key is kept private to that deployment. In such a system, any sending deployment can encrypt a message using the target deployments' public key, but that encrypted message can only be decrypted with that target deployment's private key. To use a keypair as a signature or authentication mechanism, a signing device uses the private key to "sign" a given data item, and other devices that have access to the public key can authenticate that the signature on the data item is authentic because only the signing device has the private key, and in such systems forging the signature is currently mathematically impractical.

Generally, a symmetric key is a shared secret that is shared between the transmitter and receiver, where the shared secret (e.g., the symmetric key) is used to encrypt the message and also to decrypt the message. An example symmetric key scheme includes Advanced Encryption Standard (AES) 256, which can be generated by the HSM; additional symmetric key schemes include Twofish, Blowfish, Serpent, DES, and others.

Returning to the example illustrated in FIG. 4, deployment 405 and deployment 430 are separate instances of computing environment 100 of FIG. 1 with various components discussed in FIGS. 1-3 omitted for clarity. That is, for example, deployment 405 is a first instance of computing environment 100 installed within a first VPC at a first geographic location (e.g., AWS virtual private cloud hosted in San Francisco), and deployment 430 is a second difference instance of computing environment 100 installed and hosted within a second VPC at a second geographic location (e.g., a different AWS virtual private cloud hosted from New York City). Although only two deployments are discussed here as an example, it is appreciated that each location may implement multiple deployments within the same VPC or other VPCs. For example, the VPC that is hosting deployment 405 may have other deployments each running their own instances of computing environment 100. Further, although the deployments are discussed as being geographically separated, it is appreciated that the deployments can be located within the same geographic region, albeit on different cloud systems (e.g., deployment 405 is a west coast AWS VPN instance of computing environment 100 and deployment 430 a Google Cloud instance of computing environment 100) or different subnets of a single cloud site at the same geographic location (e.g., both deployments are on a west coast AWS virtual private cloud but on different partitioned subnets).

The consumer region includes one or more accounts, where the one or more accounts are associated with one or more respective consumers of the data provided by the provider associated with the provider database. An account of the one or more accounts includes one or more links (e.g., listings). A listing may include metadata describing the shared data. A listing points to one or more databases, such as a consumer database and one or more shares that are associated with a database.

In the illustrated example, deployment 405 includes a replication manager 415 that manages authentication of the deployment with other deployments (e.g., deployment 430 and/or other deployments in a mesh with deployment 405 and deployment 430). The deployment 405 further comprises global services 420, which is a consolidated or representative sub-system including instances of 202, 204, 206, 208, 210, 212, and 214 displayed in FIG. 2. The deployment 405 further includes a database system 425 (e.g., Foundation Database (FDB)), which is another representative sub-system including instances of 216, 218, and 220. The deployment 405 further includes HSM 410, which, as discussed, is a hardware security module that can generate and manage encryption keys for the deployment 405. Further, deployment_A includes channel manager 433 that manages transmission of data to and from other deployments over a channel 470.

Deployment 430 is an example deployment of computing environment 100 located at a second geographic location (e.g., New York City). As illustrated, deployment 430 includes a replication manager 440 that manages authentication of the deployment with other deployments (e.g., deployment 405 and/or other deployments in a mesh with deployment 405 and deployment 430). The deployment 430 further comprises global services 445, which is a consolidated or representative sub-system including instances of 202, 204, 206, 208, 210, 212, and 214 displayed in FIG. 2. The deployment 430 further includes a DB 450 (e.g., FDB), which is another representative sub-system including instances of 216, 218, and 220. Further, deployment 430 includes channel manager 477 that manages transmission of data to and from other deployments over the channel 470 (e.g., via one or more hosted connection to a private network), according to some example embodiments.

The database architecture 400 further includes global deployment security system 455, according to some example embodiments. As illustrated, the global deployment security system 455 includes a global HSM 460 which generates an asymmetric keypair, including a global public key and a global private key 461. The global public key is widely distributed (e.g., to all deployments in the mesh) and can be used by the deployments to check whether an item of data (e.g., a public key of an unknown deployment) was actually signed by the global signing key of global deployment security system 455 (e.g., using PKI signing operations discussed above). In the following example, deployment 405 is the primary database and seeks to send replication traffic to deployment 430, though it is appreciated that in reverse processes, the architecture 400 can be implemented to send traffic from deployment 430 to deployment 405.

In some example embodiments, to authenticate the deployment 405, the global deployment security system 455 signs the authentication public key of the deployment 405 with the global signing key, thereby indicating to other deployments that the deployment 405 is who it says it is (e.g., that is, an authenticated deployment and not a malicious or compromised deployment).

In some example embodiments, to initiate channel 470, deployment 405 sends deployment 430 the authentication public key of deployment 405, which has been signed by the global signing key of global deployment security system 455. In some example embodiments, the setup communications are sent over the VPN nodes, while in other embodiments the setup communications are transmitted to destination deployments over the Internet (e.g., encrypted traffic), where the setup communications can include key or authentication data that is not replication data, according to some example embodiments.

Deployment 430 receives the key data, and if the key is not signed by the global deployment security system 455, the deployment 430 rejects further communications from the deployment 405. Assuming the received public key is signed by the global deployment security system 455, the deployment 430 saves network address data (e.g., URLs) and other data describing deployment 405 (e.g., tasks/functions) for further communications.

In some example embodiments, after channel 470 is established, the deployment 405 can send encrypted data to deployment 430, such as replication files from one or more databases of deployment 405 (e.g., data storage devices 124 connected to the execution units of deployment 405). The messages of channel 470 are transmitted by way of one or more nodes or networked servers of a virtual private network. In some example embodiments, to encrypt and decrypt the data sent over the channel 470, HSM 410 generates a replication asymmetric key pair for deployment 405, and HSM 435 generates a replication asymmetric key pair for deployment 430, where the public keys from of each deployment can be widely spread and used to encrypt data sent to the destination deployment. For example, deployment 405 can send a data file encrypted with the public key of deployment 430, so that only deployment 430 can decrypt the file. Further, each data message may initially be encrypted using a data encryption key (DEK) and further encrypted using a wrapping replication key (e.g., a symmetric key different than the DEK), which can be included in the files sent to the destination deployment, e.g., deployment 430.

Although in the above examples, two different asymmetric key pairs were generated for deployment 405—one for authentication and one for the sending of database data—in some example embodiments a single asymmetric keypair is used to both authenticate the deployment and send the encrypted data. For example, a keypair can be generated for deployment 405 and the public key of the keypair can be signed by the global private key from the global deployment security system 455. After the public key pair is signed, the deployment 405 can send the signed public key to deployment 430 to both authenticate deployment 405 and to later send traffic to deployment 405. That is, for example, deployment 430 receives the signed public key and knows that it can trust deployment 405 because the public key is a signed global private key, which only global deployment security system 455 has access to (e.g., as managed by global HSM 460). Further, the deployment 430 can use the signed public key to encrypt and send data back to deployment 405, where it is guaranteed that only deployment 405 can decrypt the data as only deployment 405 has the corresponding private key. In this way, and in accordance with some example embodiments, a single asymmetric keypair is used to both authenticate and send data to a given deployment.

Figure 5:
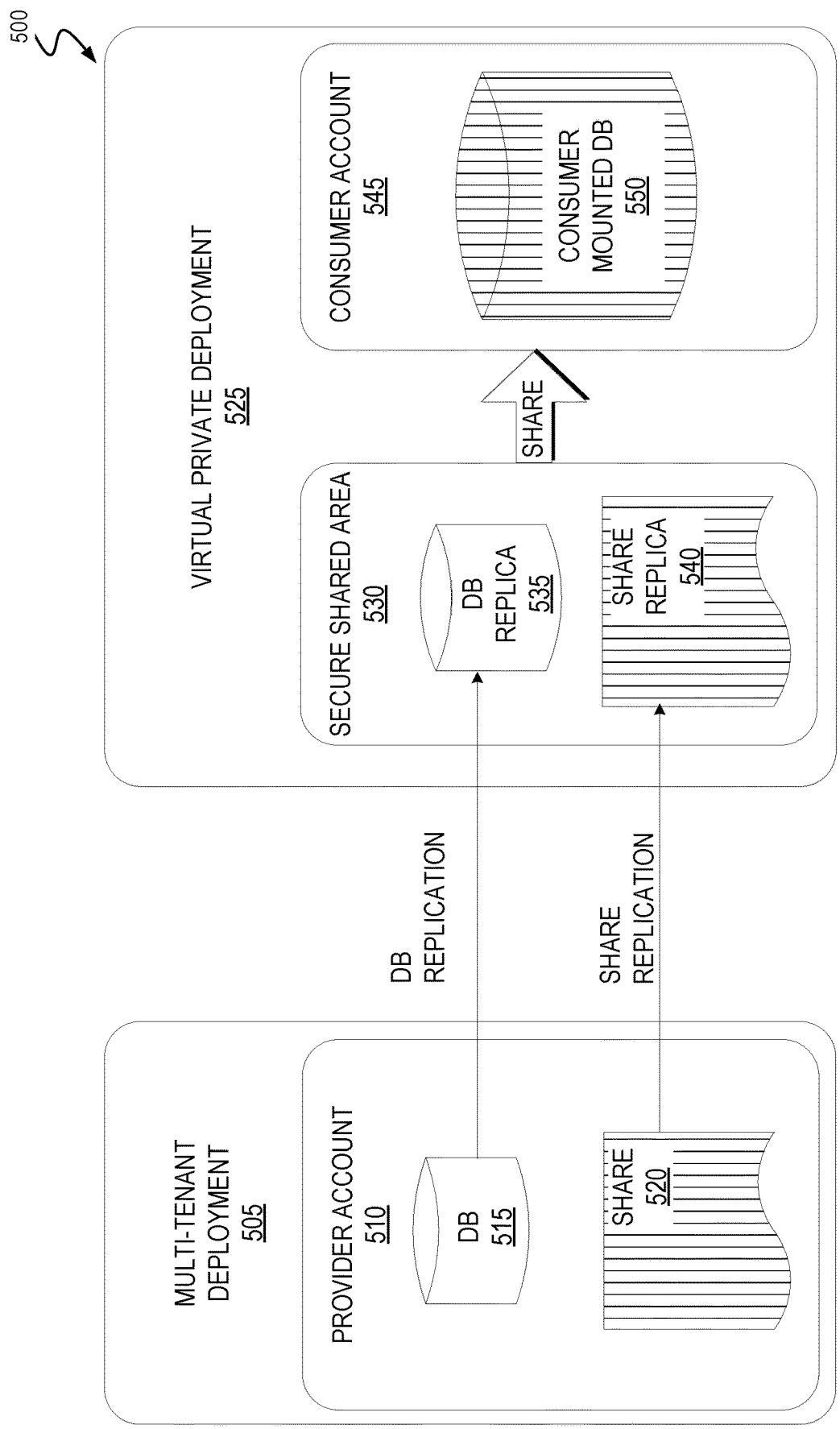
FIG. 5 is a block diagram illustrating a share data architecture, according to some example embodiments.

FIG. 5 shows the secure share data architecture 500, according to some example embodiments. The multi-tenant deployment 505 comprises a plurality of provider accounts that operate computational devices within the same deployment as co-tenants. In the example illustrated, the multi-tenant deployment 505 comprises a provider account 510, which has a database 515 and a share object 520. A share can include grant metadata describing access grants made to the consumer database for the one or more consumers of the consumer region. The share is an object that acts as a wrapper or a container around the database. The share includes multiple objects and can be shared with various users, which grants those users access to those objects. In various different embodiments, only entities that have had a given share shared with them are able to see and access whatever one or more objects that are associated by that given share.

In some example embodiments, the provider account 510 creates a link (e.g., a listing) to share data with a consumer account 545 that is in a virtual private deployment 525, which is deployment dedicated or managed only by a single organization (e.g., banking organization) and no other tenants are hosted in the virtual private deployment 525, unlike the multi-tenant deployment 505.

The consumer account 545 can receive and click on the link created by the provider account 510 to share data with the virtual private deployment 525. Upon the link being selected, the secure shared area 530 is automatically created by the secure share system 230 in the virtual private deployment 525 (e.g., programmatically, without end-user interaction). The secure shared area 530 operates as a database account, with restrictions, including no user facing interface (e.g., no login access). Further in response to the link being selected, the database 515 is replicated into the secure shared area 530 as database replica 535, and the share object 520 is replicated into the secure shared area 530 as the share object replica 540.

In the exemplary embodiment of FIG. 5, the data in the secure shared area 530 is then shared with the consumer account 545 as data share objects, which the consumer account 545 can mount as a consumer mounted database 550. Once the consumer mounted database 550 is created and has access to the replicated share data, the consumer account 545 can then perform database operations (e.g., queries) on the provider's data within the virtual private deployment 525 in a secure and computationally efficient manner. The consumer mounted database 550 includes only the replicated data from the share replication from the provider account 510.

For example, a user of a cloud data platform, such as the cloud data platform 102, may be a provider-user, such as provider account 510, that creates "shares" and makes the "shares" available to other users of the data platform to consume. Data providers may share a database or a portion of a database with one or more other data platform users, by maintaining or supporting grants to provide granular access control to selected objects in the database (e.g., access privileges are granted for one or more specific objects in a database). A provider-user may create a "share" 520 of a database, where the "share" 520 may be an object that encapsulates information required to share a database with other users. For example, a share may consist of privileges that grant access to one or more databases, data tables, data views, functions, stored procedures, schema containing the objects to share, privileges that grant access to the specific objects in the one or more databases, and/or consumer accounts with which the one or more databases and its objects are shared.

The database shares may be configured or created by the provider-user and accessed or imported by a data consumer or consumer-user, such as the consumer account 545, of the data platform. Once a database is shared with or created in a consumer-user's platform from the share, all the shared objects are accessible to the consumer-user. A consumer-user, also referred to as a consumer, data consumer, or the like, may include a user that creates one or more databases from one or more shares made available by a data provider. For example, a data consumer, once a shared database is connected, can access and/or query the objects in the database. In some example embodiments, a user may be a consumer, a provider, or both a consumer and a provider of shared data. Additionally, third-party users may exist that share data from only a single provider.

Figure 6:
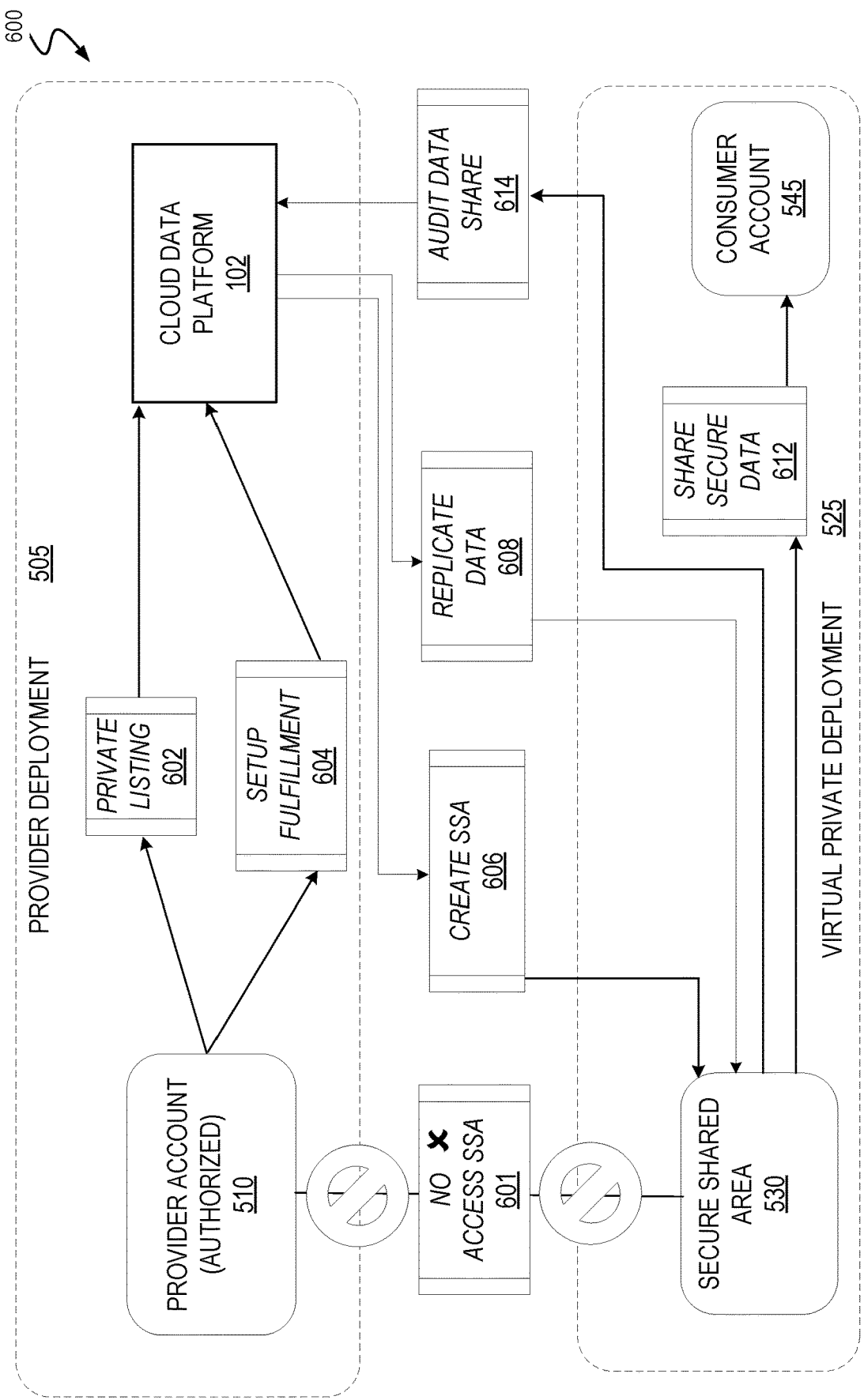
FIG. 6 is a block diagram depicting a secure share data replication, according to example embodiments.

FIG. 6 shows a block diagram 600 depicting the share of secure data from a provider account 510 to a consumer account 545, according to some example embodiments. In the example of FIG. 6, the provider deployment may be a multi-tenant deployment 505 that includes a provider account 510. The provider deployment 505 is used to initiate a secure data share with the consumer account 545 that is in a virtual private deployment 525 where the virtual private deployment 525 is dedicated or managed only by a single organization (e.g., banking organization) and no other tenants or users are hosted in the virtual private deployment 525, unlike the multi-tenant deployment 505.

As the provider account 510 cannot access the virtual private deployment 525 of the consumer directly, the provider account 510 cannot access the secured share area (SSA) 530 directly through a step 601. For example, the provider account will not acquire or access the private deployment via log-in credentials. In order to facilitate the secure sharing of data from the provider account 510 to the consumer account 545, the consumer account must acknowledge that the provider account is an authorized account to share data to the secure shared area 530. This enables the consumer user to decide which provider organization is permitted to share data from a public region, into the private region of the virtual private deployment. The provider organization can be enabled to view which virtual private deployment 525 with which they are authorized to share data, as well as be enabled to share into the virtual private deployment via a system stored process or system function.

For security (e.g., in order for the consumer account to maintain data separation) the provider organization cannot access the virtual private deployment 525 for other purposes. For example, the provider organization is not authorized to create an account in the virtual private deployment. The provider account can further be authorized and enabled to share the same or different data to more than one account in the virtual private deployment 525. In some examples, the provider account 510 is further authorized to remove select accounts from the secure shared area or delete the provider-account-supplied data from the secure share area 530. In additional examples, a provider account can view and maintain usage analytics and other metadata related to the secure share area 530.

Returning to the example embodiment of FIG. 6, once the consumer account 545 recognizes the provider account as an authorized provider, the consumer account provides consumer account information to the provider account. For example, the consumer account 545 can provide the consumer's virtual private deployment account alias to the authorized provider account. Once the consumer account 545 authorizes the provider account 510, the authorized provider account can share a link (e.g., private listing) 602 created by the provider with the consumer account. The provider account will be configured to publish private listings to specific consumers, and only those specific consumers will be able to discover and get data from the private listing. For example, the provider account can complete a fulfillment setup 604 with the cloud data platform.

Once the private listing 602 is shared, the consumer account 545 can request data from the provider account directly to the consumer's virtual private deployment. For example, the consumer account 545 provides information to the cloud data platform 102 that the consumer account requests data from the authorized provider account 510. Upon such consumer account demand, the cloud data platform provides automatic listing replication such that secure sharing will be automatically replicated when the consumer account demands data from a private listing in the provider's region. Further, upon such consumer account demand for data, the cloud data platform 102 automatically creates 606 a secured shared area 530. Once the secure shared area 530 is created, the cloud data platform 102 automatically replicates the data 608 requested by the consumer account. Once the secure shared area is created, the cloud data platform can receive notification of completion, and share the secure data 612 with the consumer account 545 in the virtual private deployment. The secure shared area 530 updates automatically based on automatic or manual audits performed on the shared data 614. The automatic or manual audits performed on the shared data may include detecting modifications to the data, changes to the data, updates to the data, deletions of the data, or the like. Further examples provide a confirmation of successful replication of the shared data between the provider account and the secure shared area, as well as the share of the share replica between the secure shared area and the consumer-mounted database of the consumer account. Confirmation of success may include notifying the provider account of the share replication completion, as well as other notifications actions.

Figure 7:
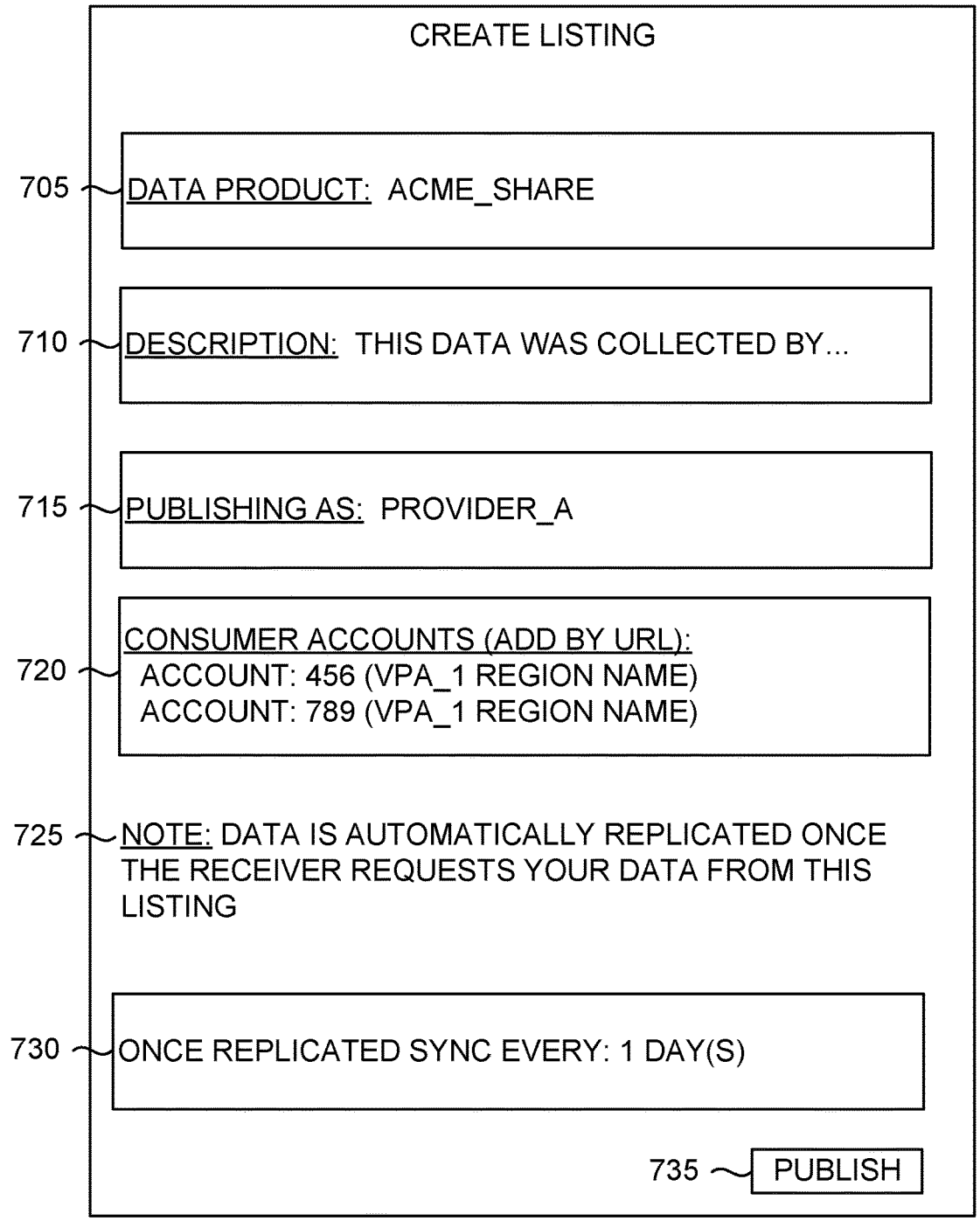
FIG. 7 is an interface diagram illustrating a share creation user interface for securely sharing data to a virtual private deployment of a distributed database system, according to some example embodiments.

FIG. 7 shows a private deployment share creation user interface 700 for securely sharing data to a virtual private deployment of the cloud data platform 102, in accordance with some example embodiments. An element 705 is a field that can be implemented to specify which data product to share to the virtual private deployment (e.g., database 515 and share object 520). An element 710 is a description field in which strings that describe the data to be shared can be included. An element 715 is a field to specify which provider account is publishing the data for sharing into the virtual private deployment. An element 720 is a field in which multiple consumer accounts can be specified by network address (e.g., URL) or identifier that is unique to the different consumer accounts on the cloud data platform 102. In some example embodiments, only the consumer accounts that are input into the element 720 will receive notifications or otherwise be able to access the data to be shared from the multi-tenant deployment (e.g., from the provider account 510). An element 725 is a text field that indicates the data is automatically replicated once the receiver requester data from this listing (e.g., the data is automatically shared to the secure shared area 530 is automatically created within the virtual private deployment 525 in response to the link being selected by the consumer account 545). An element 730 is a field to specify how often to sync the data from the provider account in the multi-tenant deployment to the secure shared area in the virtual private deployment. An element 735 is a published moment that causes the secured shared area to be created after which point consumer accounts receive notification and data is replicated and shared, as discussed above.

Figure 8:
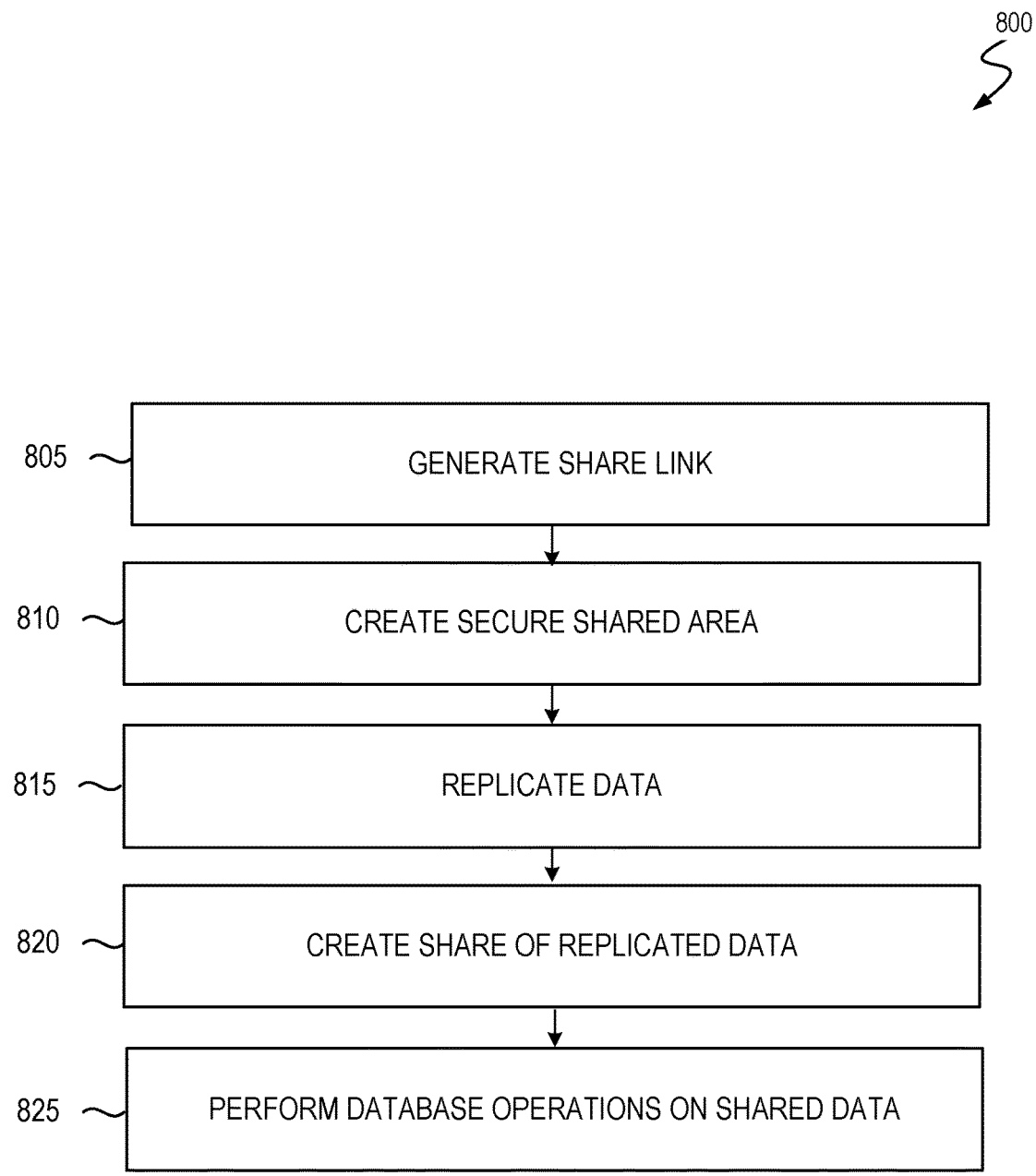
FIG. 8 is a flow diagram illustrating operations of a method for sharing data into a virtual private deployment, according to some example embodiments.

FIG. 8 shows a flow diagram of a method 800 for sharing data into a virtual private deployment, according to some example embodiments. The method 800 can be embodied in machine-readable instructions for execution by one or more hardware components (e.g., one or more processors) such that the operations of the method 800 can be performed by components of the cloud data platform 102. Accordingly, the method 800 is described below, by way of example with reference to components of the cloud data platform 102. However, it shall be appreciated that method 800 can be deployed on various other hardware configurations and is not intended to be limited to deployment within the cloud data platform 102.

Depending on the embodiment, an operation of the method 800 can be repeated in different ways or involve intervening operations not shown. Though the operations of the method 800 can be depicted and described in a certain order, the order in which the operations are performed may vary among embodiments, including performing certain operations in parallel or performing sets of operations in separate processes.

At operation 805, the secure share system 230 generates a share link. For example, the provider account 510 implements the private deployment share creation user interface 700 to create a share link for the data to be shared with the consumer account 545 in the virtual private deployment 525.

At operation 810, the secure share system 230 creates a secure shared area 530 in the virtual private deployment 525 (e.g., in response to the link of operation 805 being selected by the consumer account 545). At operation 815, the provider data is replicated. For example, the database 515 and the share object 520 are replicated from the provider account 510 to the secure shared area 530. At operation 820, the secure share system 230 shares the replicated data. For example, the database replica 535 the share object replica 540 is shared within the virtual private deployment 525 into a consumer account 545. At operation 825, the consumer account 545 performs one or more database operations on the shared data (e.g., queries).

In additional examples embodiments of the method 800, the provider account is authorized by the consumer account to share more than one share object via the secure shared area 530. Additional secure shared areas can be created in the virtual private deployment from the same authorized provider account or from additional authorized provider accounts.

Figure 9:
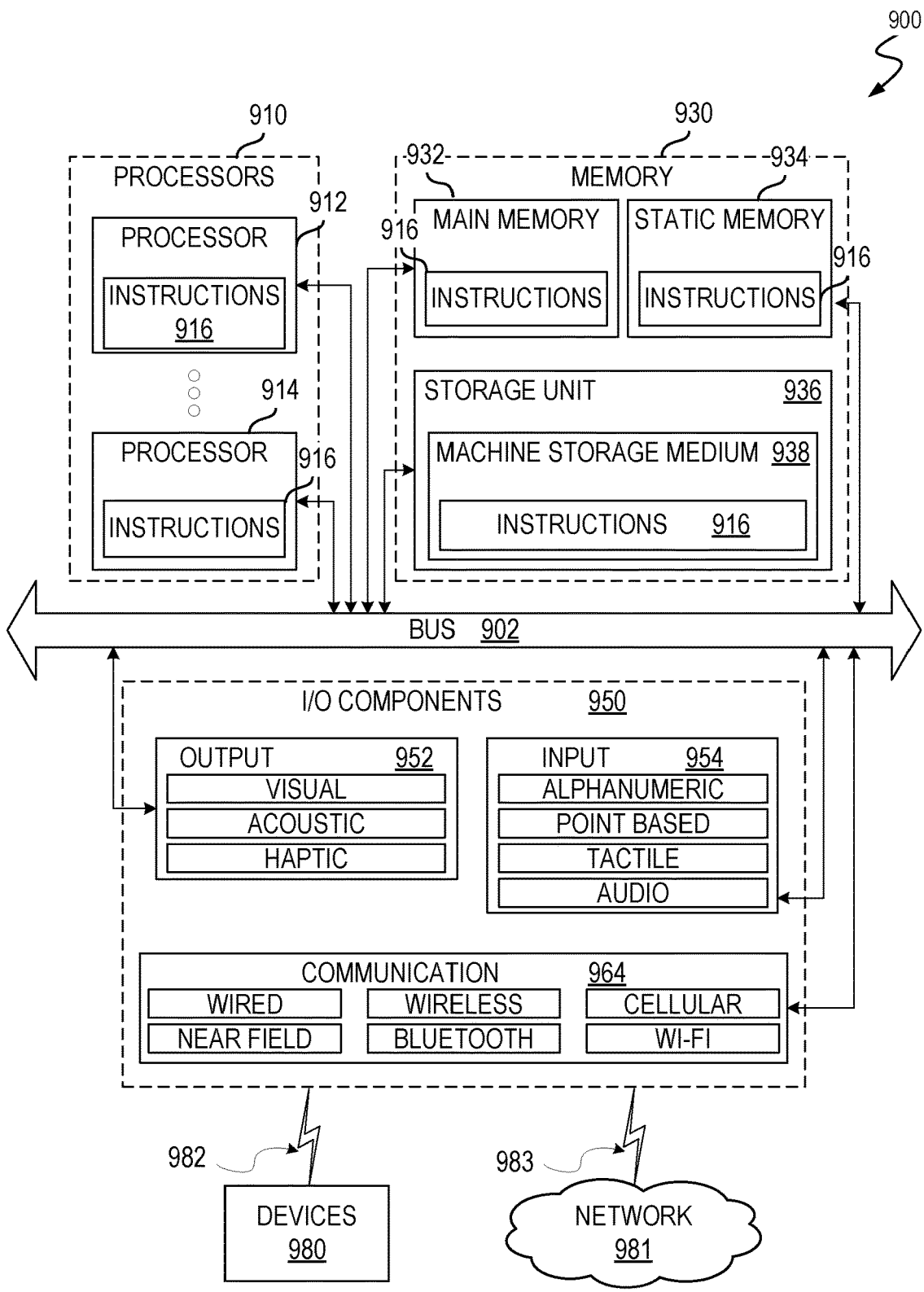
FIG. 9 illustrates a diagrammatic representation of a machine in the form of a computer system within which a set of instructions can be executed for causing the machine to perform any one or more of the methodologies discussed herein, in accordance with some embodiments of the present disclosure.

FIG. 9 illustrates a diagrammatic representation of a machine 900 in the form of a computer system within which a set of instructions can be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein can be executed. For example, the instructions 916 may cause the machine 900 to execute any one or more operations of any one or more of the methods described herein. As another example, the instructions 916 may cause the machine 900 to implement portions of the data flows described herein. In this way, the instructions 916 transform a general, non-programmed machine into a particular machine 900 (e.g., the compute service manager 108, the execution platform 110, client device 114) that is specially configured to carry out any one of the described and illustrated functions in the manner described herein.

In alternative embodiments, the machine 900 operates as a standalone device or can be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 includes processors 910, memory 930, and input/output (I/O) components 950 configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 comprising a machine storage medium 938 may store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication can be implemented using a wide variety of technologies. The I/O components 950 may include communication components 964 operable to couple the machine 900 to a network 981 via a coupling 983 or to devices 980 via a coupling 982. For example, the communication components 964 may include a network interface component or another suitable device to interface with the network 981. In further examples, the communication components 964 may include wired communication components, wireless communication components, cellular communication components, and other communication components to provide communication via other modalities. The devices 980 can be another machine or any of a wide variety of peripheral devices (e.g., a peripheral device coupled via a universal serial bus (USB)). For example, as noted above, the machine 900 may correspond to any one of the client devices 114, the compute service manager 108, the execution platform 110, and the devices 980 may include any other of these systems and devices.

The various memories (e.g., 930, 932, 934, and/or memory of the processor(s) 910 and/or the storage unit 936) may store one or more sets of instructions 916 and data structures (e.g., software) embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and can be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 981 can be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 981 or a portion of the network 981 may include a wireless or cellular network, and the coupling 983 can be a Code Division Multiple Access (CDMA) connection, a Global System for Mobile communications (GSM) connection, or another type of cellular or wireless coupling. In this example, the coupling 983 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 can be transmitted or received over the network 981 using a transmission medium via a network interface device (e.g., a network interface component included in the communication components 964) and utilizing any one of a number of well-known transfer protocols (e.g., hypertext transfer protocol (HTTP)). Similarly, the instructions 916 can be transmitted or received using a transmission medium via the coupling 982 (e.g., a peer-to-peer coupling) to the devices 980. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Described implementations of the subject matter can include one or more features, alone or in combination as illustrated below by way of example.

Example 1 can include a method comprising: receiving, by at least one hardware processor, input data indicative of a selection of a link of a primary database to share data from the primary database to a secondary database, the primary database hosted in a multi-tenant deployment in a distributed database, the secondary database hosted in a private deployment of the distributed database; in response to the link, creating a secure share area in the private deployment; replicating the data from the multi-tenant deployment to the private deployment; sharing, in the private deployment, the data from the secure share area to the secondary database; and performing one or more database operations on the shared data in the secondary database.

In Example 2, the subject matter of Example 1 optionally includes wherein further comprising: detecting a modification to the data in the primary database; updating the replicated data from the multi-tenant deployment to the private deployment; and sharing the updated data from the secure share area to the secondary database.

In Example 3, the subject matter of any one of Examples 1-2 optionally include wherein creating the secure share area in the private deployment further comprises: generating metadata describing a set of data objects included in the shared data.

In Example 4, the subject matter of any one of Examples 1-3 optionally include wherein replicating the data from the multi-tenant deployment to the private deployment further comprises: receiving confirmation that the data was successfully replicated; and notifying a user of the secondary database hosted in the private deployment of the distributed database of the confirmation.

In Example 5, the subject matter of any one of Examples 1-4 optionally include wherein performing the one or more database operations on the shared data in the secondary database further comprises querying the shared data.

In Example 6, the subject matter of any one of Examples 1-5 optionally include wherein receiving the input data indicative of the selection of the link of the primary database to share data from the primary database to the secondary database further comprises: receiving identifying information related to the primary database to identify the primary database hosted in the multi-tenant deployment as an authorized database, wherein the authorized database will not acquire direct access to the private deployment.

In Example 7, the subject matter of any one of Examples 1-6 optionally include wherein the link of the primary database includes a private listing offering shared data.

In Example 8, the subject matter of Example 7 optionally includes wherein replicating the data from the multi-tenant deployment to the private deployment further comprises: creating a replica share of the data in the secure share area in the private deployment; and linking the replica share to the private listing offering shared data.

In Example 9, the subject matter of any one of Examples 1-8 optionally include wherein the shared data includes at least one of a data table, a data schema, a data view, a function, and a stored procedure.

Example 10 can include a system comprising: one or more hardware processors of a machine; and at least one memory storing instructions that, when executed by the one or more hardware processors, cause the machine to perform operations comprising: receiving, by at least one hardware processor, input data indicative of a selection of a link of a primary database to share data from the primary database to a secondary database, the primary database hosted in a multi-tenant deployment in a distributed database, the secondary database hosted in a private deployment of the distributed database; in response to the link, creating a secure share area in the private deployment; replicating the data from the multi-tenant deployment to the private deployment; sharing, in the private deployment, the data from the secure share area to the secondary database; and performing one or more database operations on the shared data in the secondary database.

In Example 11, the subject matter of Example 10 optionally includes wherein the operations further comprising: detecting a modification to the data in the primary database; updating the replicated data from the multi-tenant deployment to the private deployment; and sharing the updated data from the secure share area to the secondary database.

In Example 12, the subject matter of any one of Examples 10-11 optionally include optionally includes wherein creating the secure share area in the private deployment further comprises: generating metadata describing a set of data objects included in the shared data.

In Example 13, the subject matter of any one of Examples 10-12 optionally include wherein replicating the data from the multi-tenant deployment to the private deployment further comprises: receiving confirmation that the data was successfully replicated; and notifying a user of the secondary database hosted in the private deployment of the distributed database of the confirmation.

In Example 14, the subject matter of any one of Examples 10-13 optionally include wherein performing the one or more database operations on the shared data in the secondary database further comprises querying the shared data.

In Example 15, the subject matter of any one of Examples 10-14 optionally include wherein receiving the input data indicative of the selection of the link of the primary database to share data from the primary database to the secondary database further comprises: receiving identifying information related to the primary database to identify the primary database hosted in the multi-tenant deployment as an authorized database, wherein the authorized database will not acquire direct access to the private deployment.

In Example 16, the subject matter of any one of Examples 10-15 optionally include wherein the link of the primary database includes a private listing offering shared data.

In Example 17, the subject matter of Example 16 optionally includes wherein replicating the data from the multi-tenant deployment to the private deployment further comprises: creating a replica share of the data in the secure share area in the private deployment; and linking the replica share to the private listing offering shared data.

In Example 18, the subject matter of Example 17 optionally includes wherein the shared data includes at least one of a data table, a data schema, a data view, a function, and a stored procedure.

Example 19 can include a machine-readable storage device embodying instructions that, when executed by a machine, cause the machine to perform operations comprising: receiving, by at least one hardware processor, input data indicative of a selection of a link of a primary database to share data from the primary database to a secondary database, the primary database hosted in a multi-tenant deployment in a distributed database, the secondary database hosted in a private deployment of the distributed database; in response to the link, creating a secure share area in the private deployment; replicating the data from the multi-tenant deployment to the private deployment; sharing, in the private deployment, the data from the secure share area to the secondary database; and performing one or more database operations on the shared data in the secondary database.

In Example 20, the subject matter of Example 19 optionally includes wherein detecting a modification to the data in the primary database; updating the replicated data from the multi-tenant deployment to the private deployment; and sharing the updated data from the secure share area to the secondary database.

In Example 21, the subject matter of any one of Examples 19-20 optionally include wherein creating the secure share area in the private deployment further comprises: generating metadata describing a set of data objects included in the shared data.

In Example 22, the subject matter of any one of Examples 19-21 optionally include wherein replicating the data from the multi-tenant deployment to the private deployment further comprises: receiving confirmation that the data was successfully replicated; and notifying a user of the secondary database hosted in the private deployment of the distributed database of the confirmation.

In Example 23, the subject matter of any one of Examples 19-22 optionally include wherein performing the one or more database operations on the shared data in the secondary database further comprises querying the shared data.

In Example 24, the subject matter of any one of Examples 19-23 optionally include wherein receiving the input data indicative of the selection of the link of the primary database to share data from the primary database to the secondary database further comprises: receiving identifying information related to the primary database to identify the primary database hosted in the multi-tenant deployment as an authorized database, wherein the authorized database will not acquire direct access to the private deployment.

In Example 25, the subject matter of any one of Examples 19-24 optionally include wherein the link of the primary database includes a private listing offering shared data.

In Example 26, the subject matter of Example 25 optionally includes wherein replicating the data from the multi-tenant deployment to the private deployment further comprises: creating a replica share of the data in the secure share area in the private deployment; and linking the replica share to the private listing offering shared data.

In Example 27, the subject matter of any one of Examples 19-26 optionally include wherein the shared data includes at least one of a data table, a data schema, a data view, a function, and a stored procedure.

The terms "machine-readable medium," "computer-readable medium," and "device-readable medium" mean the same thing and can be used interchangeably in this disclosure. The terms are defined to include both machine-storage media and transmission media. Thus, the terms include both storage devices/media and carrier waves/modulated data signals.

The various operations of example methods described herein can be performed, at least partially, by one or more processors that are temporarily configured (e.g., by software) or permanently configured to perform the relevant operations. Similarly, the methods described herein can be at least partially processor implemented. For example, at least some of the operations of the methods described herein can be performed by one or more processors. The performance of certain of the operations can be distributed among the one or more processors, not only residing within a single machine, but also deployed across a number of machines. In some example embodiments, the processor or processors can be located in a single location (e.g., within a home environment, an office environment, or a server farm), while in other embodiments the processors can be distributed across a number of locations.

Although the embodiments of the present disclosure have been described with reference to specific example embodiments, it will be evident that various modifications and changes can be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter can be practiced. The embodiments illustrated are described in sufficient detail to enable those skilled in the art to practice the teachings disclosed herein. Other embodiments can be used and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
    receiving, by at least one hardware processor, input data indicative of a selection of a link of a primary database to share data from the primary database to a secondary database, the primary database hosted in a multi-tenant deployment in a distributed database, the secondary database hosted in a private deployment of the distributed database;
    in response to receiving the input data indicative of the selection of the link, creating a secure share area in the private deployment, the secure share area including an isolated environment within the private deployment, the secure share area excluding a user-facing interface;
    replicating the data from the multi-tenant deployment to the secure share area in the private deployment;
    sharing, in the private deployment, the replicated data from the secure share area to the secondary database; and
    performing one or more database operations on the shared replicated data in the secondary database.

2. The method of claim 1, further comprising:
    detecting a modification to the data in the primary database;
    updating the replicated data from the multi-tenant deployment to the private deployment;
    and sharing the updated data from the secure share area to the secondary database.

3. The method of claim 1, wherein creating the secure share area in the private deployment further comprises:
    generating metadata describing a set of data objects included in the shared replicated data.

4. The method of claim 1, wherein replicating the data from the multi-tenant deployment to the private deployment further comprises:
    receiving confirmation that the data was successfully replicated; and
    notifying a user of the secondary database hosted in the private deployment of the distributed database of the confirmation.

5. The method of claim 1, wherein performing the one or more database operations on the shared replicated data in the secondary database further comprises querying the shared replicated data.

6. The method of claim 1, wherein receiving the input data indicative of the selection of the link of the primary database to share data from the primary database to the secondary database further comprises:
    receiving identifying information related to the primary database to identify the primary database hosted in the multi-tenant deployment as an authorized database, wherein the authorized database will not acquire direct access to the private deployment.

7. The method of claim 1, wherein the link of the primary database includes a private listing offering shared data.

8. The method of claim 7, wherein replicating the data from the multi-tenant deployment to the private deployment further comprises:
    creating a replica share of the data in the secure share area in the private deployment; and
    linking the replica share to the private listing offering shared data.

9. The method of claim 1, wherein the shared replicated data includes at least one of a data table, a data schema, a data view, a function, and a stored procedure.

10. A system comprising:
    one or more hardware processors of a machine; and at least one memory storing instructions that, when executed by the one or more hardware processors, cause the machine to perform operations comprising:
        receiving, by at least one hardware processor, input data indicative of a selection of a link of a primary database to share data from the primary database to a secondary database, the primary database hosted in a multi-tenant deployment in a distributed database, the secondary database hosted in a private deployment of the distributed database;
        in response to receiving the input data indicative of the selection of the link, creating a secure share area in the private deployment, the secure share area including an isolated environment within the private deployment, the secure share area excluding a user-facing interface;
        replicating the data from the multi-tenant deployment to the secure share area in the private deployment;
        sharing, in the private deployment, the replicated data from the secure share area to the secondary database; and
        performing one or more database operations on the shared replicated data in the secondary database.

11. The system of claim 10, the operations further comprising:
    detecting a modification to the data in the primary database;
    updating the replicated data from the multi-tenant deployment to the private deployment;
    and sharing the updated data from the secure share area to the secondary database.

12. The system of claim 10, wherein creating the secure share area in the private deployment further comprises:
    generating metadata describing a set of data objects included in the shared replicated data.

13. The system of claim 10, wherein replicating the data from the multi-tenant deployment to the private deployment further comprises:
    receiving confirmation that the data was successfully replicated; and
    notifying a user of the secondary database hosted in the private deployment of the distributed database of the confirmation.

14. The system of claim 10, wherein performing the one or more database operations on the shared replicated data in the secondary database further comprises querying the shared replicated data.

15. The system of claim 10, wherein receiving the input data indicative of the selection of the link of the primary database to share data from the primary database to the secondary database further comprises:
receiving identifying information related to the primary database to identify the primary database hosted in the multi-tenant deployment as an authorized database, wherein the authorized database will not acquire direct access to the private deployment.

16. The system of claim 10, wherein the link of the primary database includes a private listing offering shared data.

17. The system of claim 16, wherein replicating the data from the multi-tenant deployment to the private deployment further comprises:
creating a replica share of the data in the secure share area in the private deployment; and
linking the replica share to the private listing offering shared data.

18. The system of claim 17, wherein the shared data includes at least one of a data table, a data schema, a data view, a function, and a stored procedure.

19. A machine-storage media embodying instructions that, when executed by a machine, cause the machine to perform operations comprising:
receiving, by at least one hardware processor, input data indicative of a selection of a link of a primary database to share data from the primary database to a secondary database, the primary database hosted in a multi-tenant deployment in a distributed database, the secondary database hosted in a private deployment of the distributed database;
in response to receiving the input data indicative of the selection of the link, creating a secure share area in the private deployment, the secure share area including an isolated environment within the private deployment, the secure share area excluding a user-facing interface;
replicating the data from the multi-tenant deployment to the secure share area in the private deployment;
sharing, in the private deployment, the replicated data from the secure share area to the secondary database; and
performing one or more database operations on the shared replicated data in the secondary database.

20. The machine-storage media of claim 19, wherein detecting a modification to the data in the primary database;
updating the replicated data from the multi-tenant deployment to the private deployment; and sharing the updated data from the secure share area to the secondary database.

21. The machine-storage media of claim 19, wherein creating the secure share area in the private deployment further comprises:
generating metadata describing a set of data objects included in the shared replicated data.

22. The machine-storage media of claim 19, wherein replicating the data from the multi-tenant deployment to the private deployment further comprises:
receiving confirmation that the data was successfully replicated; and
notifying a user of the secondary database hosted in the private deployment of the distributed database of the confirmation.

23. The machine-storage media of claim 19, wherein performing the one or more database operations on the shared replicated data in the secondary database further comprises querying the shared replicated data.

24. The machine-storage media of claim 19, wherein receiving the input data indicative of the selection of the link of the primary database to share data from the primary database to the secondary database further comprises:
receiving identifying information related to the primary database to identify the primary database hosted in the multi-tenant deployment as an authorized database, wherein the authorized database will not acquire direct access to the private deployment.

25. The machine-storage media of claim 19, wherein the link of the primary database includes a private listing offering shared data.

26. The machine-storage media of claim 25, wherein replicating the data from the multi-tenant deployment to the private deployment further comprises:
creating a replica share of the data in the secure share area in the private deployment; and
linking the replica share to the private listing offering shared data.

27. The machine-storage media of claim 19, wherein the shared replicated data includes at least one of a data table, a data schema, a data view, a function, and a stored procedure.

* * * * *

UNITED STATES PATENT AND TRADEMARK OFFICE
CERTIFICATE OF CORRECTION

PATENT NO. : 11,841,875 B2
APPLICATION NO. : 18/060441
DATED : December 12, 2023
INVENTOR(S) : Chu et al.

It is certified that error appears in the above-identified patent and that said Letters Patent is hereby corrected as shown below:

In the Claims

In Column 27, Line 49, in Claim 2, after "deployment;", insert --and--

In Column 27, Line 50, in Claim 2, before "sharing", delete "and"

In Column 28, Line 24, in Claim 10, after "and", insert a linebreak

In Column 28, Line 53, in Claim 11, after "deployment;", insert --and--

In Column 28, Line 54, in Claim 11, before "sharing", delete "and"

In Column 30, Line 4, in Claim 20, after "and", insert a linebreak

Signed and Sealed this
Fourth Day of March, 2025

Coke Morgan Stewart
*Acting Director of the United States Patent and Trademark Office*